US008797220B2

(12) United States Patent
Ling et al.

(10) Patent No.: US 8,797,220 B2
(45) Date of Patent: *Aug. 5, 2014

(54) METHOD AND SYSTEM FOR MULTI-SERVICE RECEPTION

(71) Applicant: MaxLinear, Inc., Carlsbad, CA (US)

(72) Inventors: Curtis Ling, Carlsbad, CA (US); Paul Chominski, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,363

(22) Filed: Mar. 18, 2013

(65) Prior Publication Data

US 2013/0268976 A1    Oct. 10, 2013

Related U.S. Application Data

(63) Continuation of application No. 13/546,704, filed on Jul. 11, 2012, now Pat. No. 8,466,850.

(60) Provisional application No. 61/620,720, filed on Apr. 5, 2012.

(51) Int. Cl.
*H01Q 21/28* (2006.01)

(52) U.S. Cl.
USPC .......................... 343/725; 343/840; 343/770

(58) Field of Classification Search
USPC .......... 343/725, 727, 729, 893, 878, 840, 770
See application file for complete search history.

(56) References Cited

U.S. PATENT DOCUMENTS

| | | | | |
|---|---|---|---|---|
| 2,846,678 A * | 8/1958 | Best | ............................. | 343/727 |
| 5,933,123 A * | 8/1999 | Kaul | ............................. | 343/879 |
| 5,999,137 A * | 12/1999 | Crosby | ........................ | 343/725 |
| 6,166,703 A * | 12/2000 | Muterspaugh | .............. | 343/840 |
| 6,366,252 B1 * | 4/2002 | Terk | ............................ | 343/725 |
| 8,175,515 B1 * | 5/2012 | Rivera | ........................ | 455/3.02 |
| 8,368,611 B2 * | 2/2013 | King et al. | .................. | 343/872 |
| 8,466,850 B1 * | 6/2013 | Ling et al. | ................... | 343/878 |

OTHER PUBLICATIONS

Int'l Search Report and Written Opinion for PCT/US2013/035387 dated Nov. 8, 2013.

* cited by examiner

*Primary Examiner* — Hoanganh Le
(74) *Attorney, Agent, or Firm* — McAndrews, Held & Malloy, Ltd.

(57) ABSTRACT

A multi-service antenna may comprise: a support structure, a reflector mounted to the support structure, a signal processing assembly mounted with the support structure, a first wire strung between the reflector and the support structure and/or the signal processing assembly, and circuitry for processing a first signal received as a result of electromagnetic radiation (e.g., terrestrial television and/or cellular signals) incident on the first wire. The circuitry for processing the first signal may be housed in the signal processing assembly. A second wire may also be strung between the reflector and the support structure and/or the signal processing assembly, and the circuitry may be operable to perform diversity processing of signals received via the two wires.

18 Claims, 17 Drawing Sheets

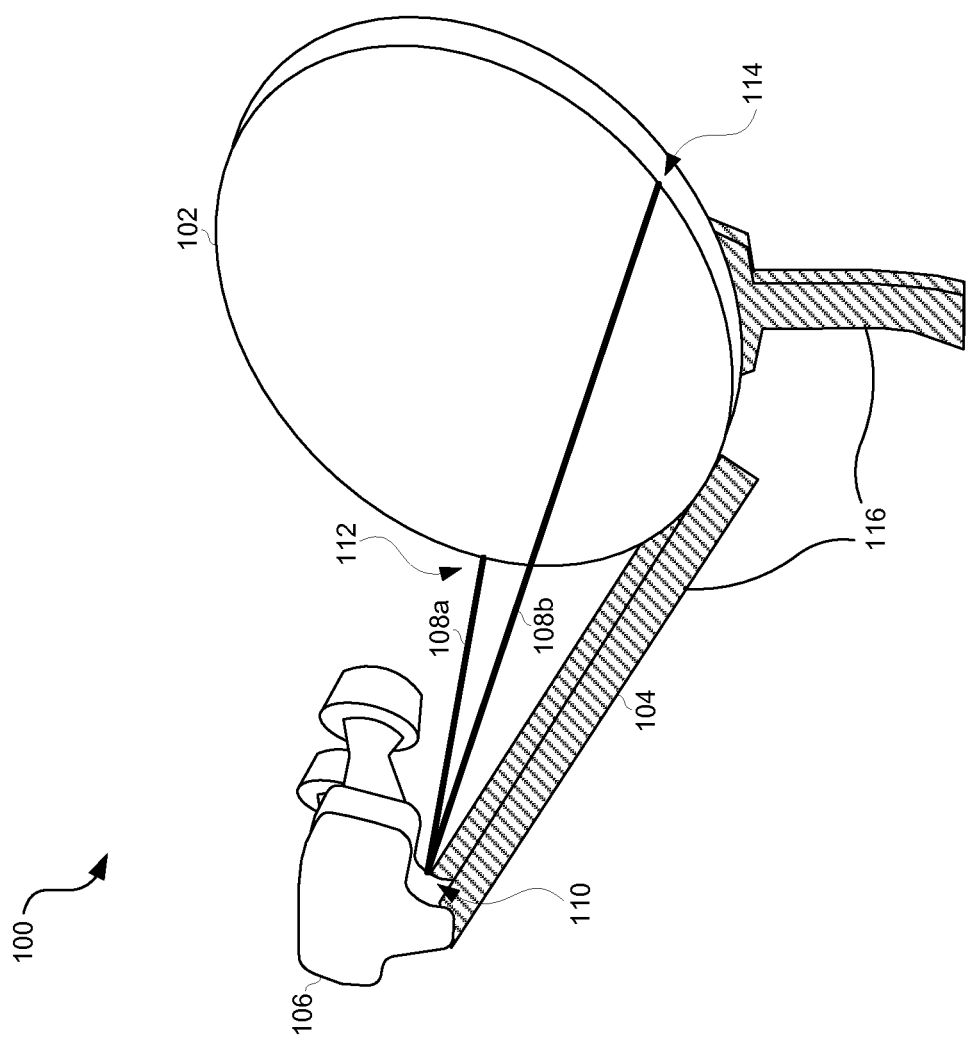

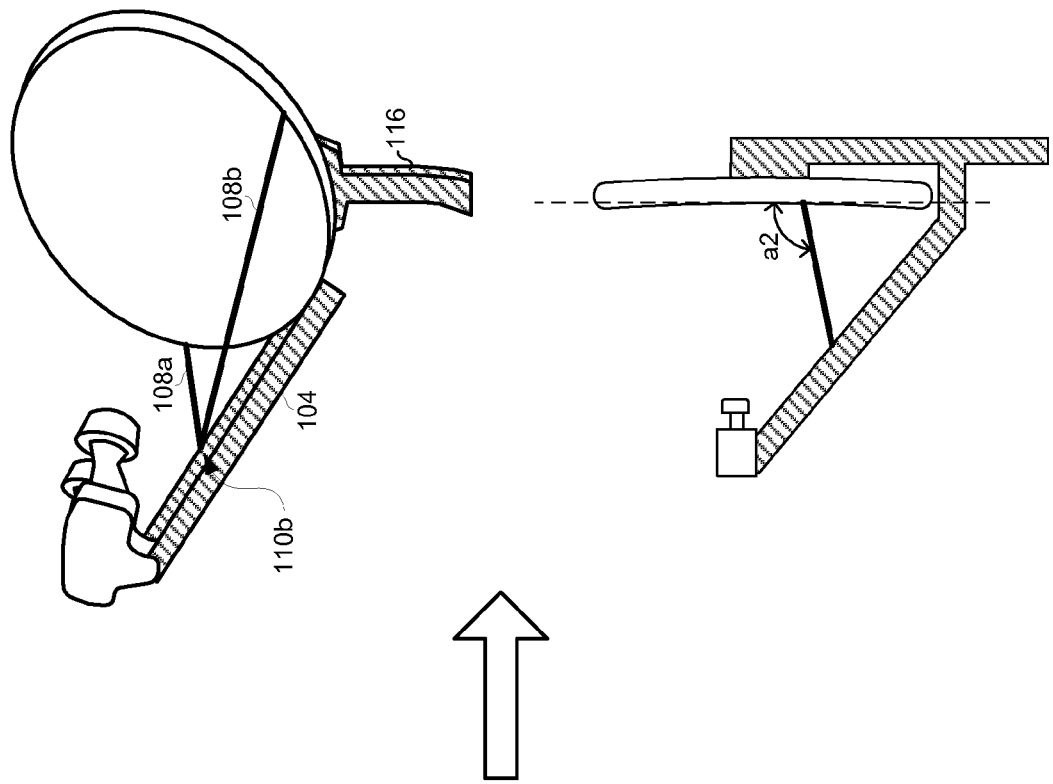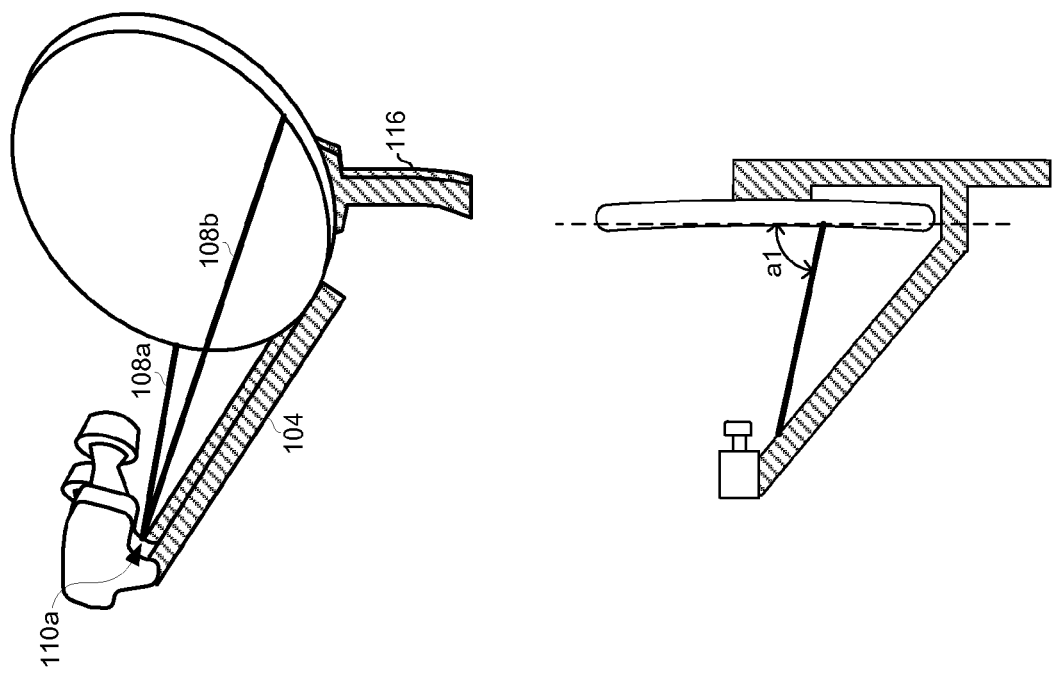
FIG. 2A

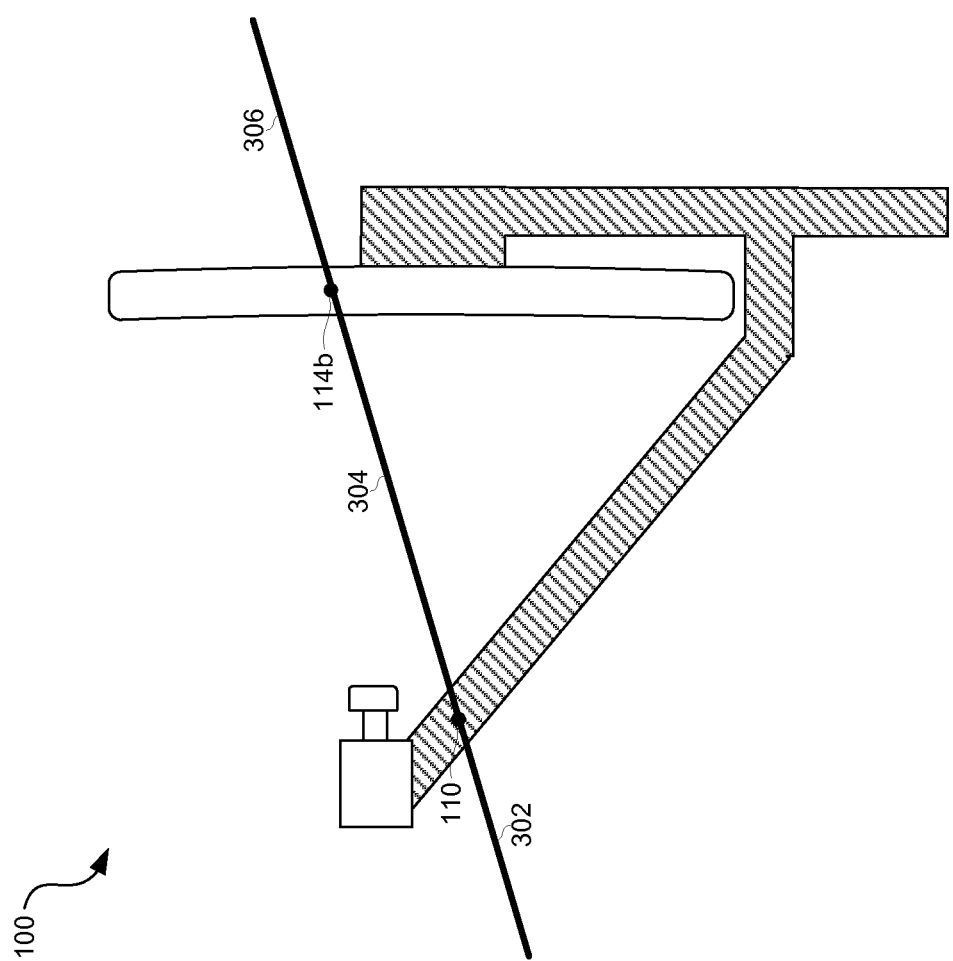

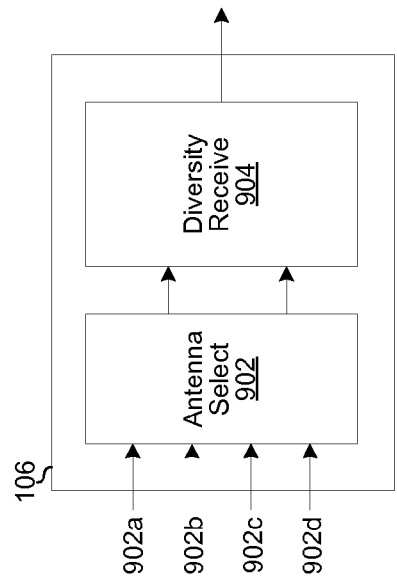
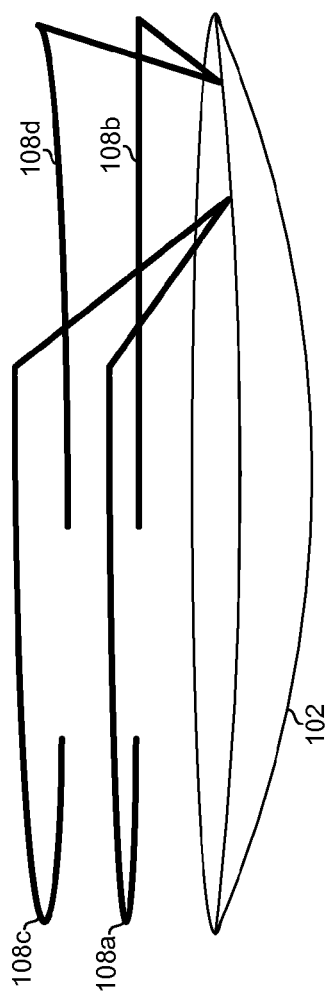
FIG. 9D
FIG. 9C

METHOD AND SYSTEM FOR MULTI-SERVICE RECEPTION

CLAIM OF PRIORITY

This patent application is a continuation of U.S. patent application Ser. No. 13/546,704 filed on Jul. 11, 2012 which, in turn, claims priority to and the benefit of U.S. Provisional Patent Application Ser. No. 61/620,720 filed on Apr. 5, 2012.

Each of the above referenced applications is hereby incorporated herein by reference in its entirety.

INCORPORATION BY REFERENCE

This patent application makes reference to:
U.S. Provisional Patent Application No. 61/658,445 entitled "Combined Terrestrial and Satellite Content for a Seamless User Experience" and filed on Jun. 12, 2012; and
U.S. patent application Ser. No. 13/326,125 entitled "System and Method in a Broadband Receiver for Efficiently Receiving and Processing Signals" and filed on Dec. 14, 2011.

The above application is hereby incorporated herein by reference in its entirety.

TECHNICAL FIELD

Aspects of the present application relate to wireless communications. More specifically, to a method and apparatus for multi-service reception.

BACKGROUND

Existing methods and systems for receiving various wireless signals can be cumbersome and inefficient. Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A method and/or apparatus is provided for multi-service reception, substantially as illustrated by and/or described in connection with at least one of the figures, as set forth more completely in the claims.

BRIEF DESCRIPTION OF THE DRAWINGS

FIG. 1 depicts an example implementation of a multi-service antenna.

FIGS. 2A and 2B depict example implementations of an adjustable multi-service antenna.

FIG. 3 depicts an example implementation of a multi-service antenna with variable-length and/or extended-length antenna elements.

FIGS. 9A-9C depict example implementations of a multi-service antenna comprising more than two antenna elements.

FIG. 9D depicts example circuitry operable to interface to a multi-service antenna comprising more than two antenna elements.

DETAILED DESCRIPTION

Figure 2B:
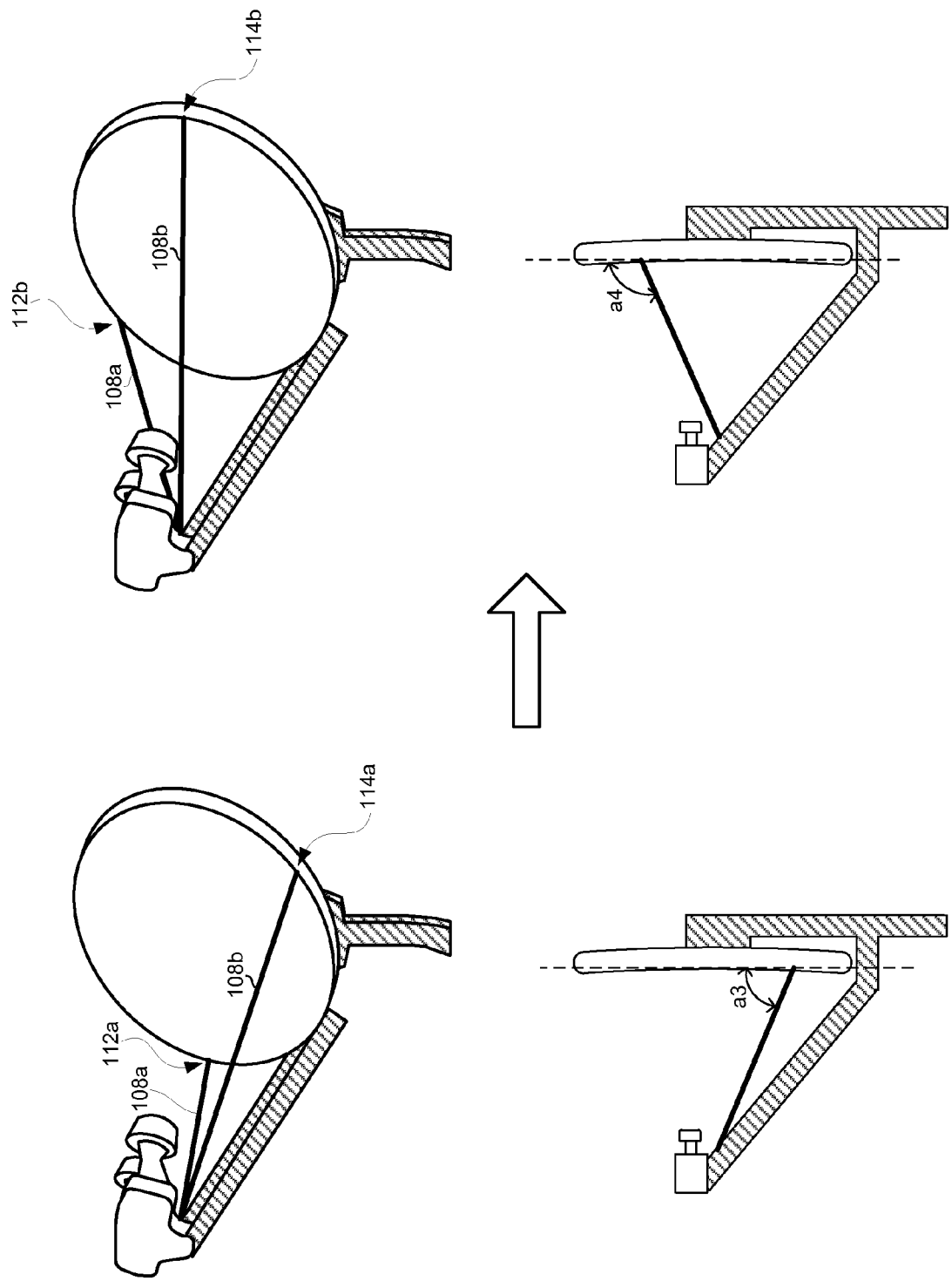

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "module" refers to functions than can be performed by one or more circuits. As utilized herein, the term "e.g.," introduces a list of one or more non-limiting examples, instances, or illustrations.

FIG. 1 depicts an example implementation of a multi-service antenna. The example multi-service antenna is a satellite dish assembly 100 comprising a support structure 116, a reflector 102, a signal processing assembly 106, and antenna elements 108a and 108b.

The support structure 116 may comprise one or more pieces of rigid material such as steel or plastic. One piece or portion of the support structure 116 is a boom 104 that enables the assembly 106 to be mounted at or near the focal point of the reflector 102. In the case where the support structure 116 comprises multiple pieces, the pieces may be, for example, bolted or welded together.

The reflector 102 may be a concave structure for reflecting electromagnetic waves (e.g., satellite signals) toward a focal point. The reflector 102 may be substantially parabolic in shape and may be made of, for example, fiberglass and/or metal.

Each of the antenna elements 108a and 108b may be made of a conductive material such that a voltage and/or current is induced when electromagnetic radiation is incident on it. In an exemplary embodiment of the invention, each of the antenna elements 108a and 108b may be a length of wire (e.g., copper and/or aluminum). The antenna elements 108a and 108b may be positioned relative to one another so as to provide spatial diversity at frequencies of interest.

In an example implementation, a first end of each of the antenna elements 108a and 108b may be attached to the reflector 102 (at points 112 and 114, respectively) and a second end of each of the antenna elements 108a and 108b may be attached to the boom 104 (at point 110). The antenna elements 108a and 108b may be attached to the reflector 102 such that they in conductive contact with the reflector 102, or may be attached to the reflector 102 via an insulating spacer such that the antenna elements are not in conductive contact with the reflector 102. In such an implementation, the boom 104 may be made of a conductive material, the boom 104 may be grounded, and the antenna elements 108a and 108b may be conductively coupled to the boom 104, thereby grounding the end of each of the antenna elements 108a and 108b that is attached to the boom 104.

In another example implementation, a first end of each of the antenna elements 108a and 108b may be attached to the reflector 102 (at points 112 and 114, respectively) and a second end of each of the antenna elements 108a and 108b may be attached to the assembly 106 (at point 110). The antenna elements 108a and 108b may be attached to the reflector 102 such that they in conductive contact with the reflector 102, or may be attached to the reflector 102 via an insulating spacer such that the antenna elements are not in conductive contact with the reflector 102. In such an implementation, the antenna elements 108a and 108b may be conductively coupled to a ground plane of the assembly 106. Because the wires have relatively small diameter and attach to the outer edges of the reflector 102, their presence may have a negligible effect on reception of satellite signals.

The assembly 106 may comprise circuitry for receiving and processing satellite signals. The assembly 106 may comprise circuitry for implementing a low-noise block downconversion (LNB) function. Furthermore, although the assembly 106 may be colloquially referred to as a "low-noise block downconverter" or "LNB," in various example implementations it may comprise circuitry operable to perform functions beyond block downconversion of received satellite signals, as can be seen from the example implementations of the assembly 106 described below with reference to FIGS. 7A, 7B, and 8. In the depicted implementation, the assembly 106 is depicted as a single physical assembly mounted to the satellite dish assembly (i.e. it is a subassembly of the satellite dish assembly). In other implementations, however, the assembly 108 may comprise multiple physical assemblies, one or more of which may reside physically separate from the satellite dish assembly and be connected to the satellite dish via one or more wired and/or wireless links.

FIGS. 2A and 2B depict example implementations of an adjustable multi-service antenna. In an example implementation shown in FIG. 2A, the point 110 at which the antenna elements 108a and 108b attach to the boom 104 may be adjustable (e.g., by sliding an attachment assembly). On the left side of FIG. 2A the antenna elements 108a and 108b are attached to the boom 104 at point 110a. On the right side of FIG. 2A the antenna elements 108a and 108b are attached to the boom 104 at point 110b. By adjusting the location of the point 110 along the boom 110, the angle of the antenna elements 108a and 108b relative to the reflector 102 may change. In this regard, on the left side of FIG. 2A an angle formed by the antenna elements is a1 and on the right side of the FIG. 2A the angle has changed to a2.

The angle of the antenna elements 108a and 108b may be adjusted to adjust the radiation pattern of the antennas 108a and 108b. For example, installation of the satellite dish assembly 100 may comprise first aligning the reflector 102 such that the direction of maximum radiation/reception of the reflector is pointed at a satellite signal source, and then adjusting the attachment point 110 such that the direction of maximum radiation/reception of the antenna elements 108a and 108b is pointed at a terrestrial signal source. In this manner, adjusting the location of point 110 can compensate for different elevation angles of the reflector 102 which may be required at different latitudes.

In various example implementation(s), the antenna elements 108a and 108b may be stretchable, telescoping, expandable, and/or otherwise adjustable in length to account for different lengths that may be required when they are attached at different points along the boom 104. In an implementation, the length to different points on the boom 104 may be compensated for by corresponding adjustments to the points at which the antenna elements 108a and 108b are attached to the reflector 102, as described with respect to FIG. 2B.

Referring now to the example implementation shown in FIG. 2B, the points 112 and 114 at which the antenna elements 108a and 108b attach, respectively, to the reflector 102 may be adjustable (e.g., by sliding an attachment assembly). On the left side of FIG. 2B the antenna elements 108a and 108b are attached to the reflector 102 at points 112a and 114a, respectively. On the right side of FIG. 2B the antenna elements 108a and 108b are attached to the reflector 102 at points 112b and 114b, respectively. By adjusting the location of the points 112 and 114, the angle of the antenna elements 108a and 108b relative to the reflector 102 may change. In this regard, on the left side of FIG. 2B an angle formed by the antenna elements is a3 and on the right side of the FIG. 2B the angle has changed to a4.

The angle of the antenna elements 108a and 108b may be adjusted to adjust the radiation pattern of the antennas 108a and 108b. For example, installation of the satellite dish assembly 100 may comprise first aligning the reflector 102 such that the direction of maximum radiation/reception of the reflector 102 is pointed at a satellite signal source, and then adjusting the attachment points 112 and 114 such that the direction of maximum radiation/reception of the antenna elements 108a and 108b is pointed at a terrestrial signal source. In this manner, adjusting the location of points 112 and 114 can compensate for different elevation and/or azimuth angles of the reflector 102 which may be required in different geographical areas.

In various example implementation(s), the antenna elements 108a and 108b may be stretchable, telescoping, expandable, and/or otherwise adjustable in length to account for different lengths that may be required when they are attached at different points along the reflector 102. In an implementation, the length to different points on the reflector 102 may be compensated for by corresponding adjustments to the point at which the antenna elements 108a and 108b are attached to the boom 104, as described with respect to FIG. 2A.

FIG. 3 depicts an example implementation of a multi-service antenna with variable-length and/or extended-length antenna elements. Shown in FIG. 3 is a side-view of an implementation of the satellite dish assembly 100 comprising an extended-length and/or extendable antenna element. The antenna element, which may represent the antenna element 108b, for example, comprises a section 302 that extends outward from the front of the satellite dish assembly 100, a section 304 that spans the distance between two points on the satellite dish assembly 100, and a section 306 that extends outward from the back of the satellite dish assembly 100. The sections 302 and 306 may be, for example made of rigid material (e.g., heavy-gauge wire and/or metallic rods) such that their weight is self-supported to stay in substantially-linear alignment with the section 304. Alternatively (or additionally), the section 302 and/or 306 may be supported by an insulating material (e.g., a plastic rod). The sections 302 and 306 may be extendable (e.g., telescoping) such that the total length of the antenna element (the combined length of sections 302, 304, and 306) is adjustable.

Figure 4:
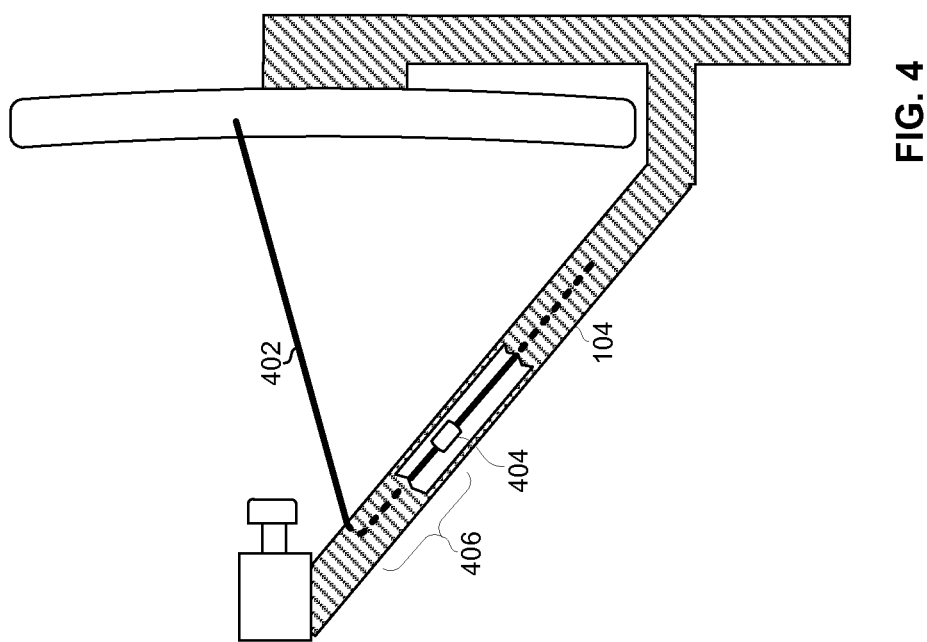
FIG. 4 depicts an example implementation of a multi-service antenna with an adjustable ground point.

FIG. 4 depicts an example implementation of a multi-service antenna with an adjustable ground point. In FIG. 4, rather than being attached to the boom 104, the wire 402 runs inside the boom 104 (which may be made of a non-conductive material). Also shown is a ferrite bead 404 attached to the wire at a point inside the boom 104. The point at which the ferrite bead 404 is attached to the wire may effectively be ground. Thus, the portion 406 of the wire 402 before the ferrite bead 404 may also radiate. Accordingly, when the ferrite bead is further along the wire than the point at which the wire enters the boom 104, the wire 402 may operate as a bent-monopole antenna. By controlling position of the ferrite bead 404, the ground point (and thus the radiation characteristics of the wire 402) may be controlled. In another implementation, rather than running inside the boom 104, the wire 402 may run along the outside the boom 104.

Figure 5A:
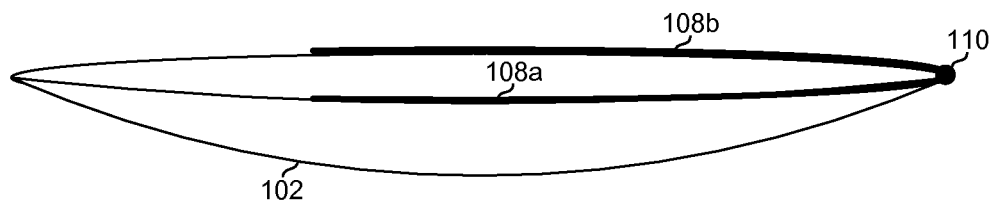
FIGS. 5A and 5B depict example implementations of a multi-service antenna.
Figure 5B:
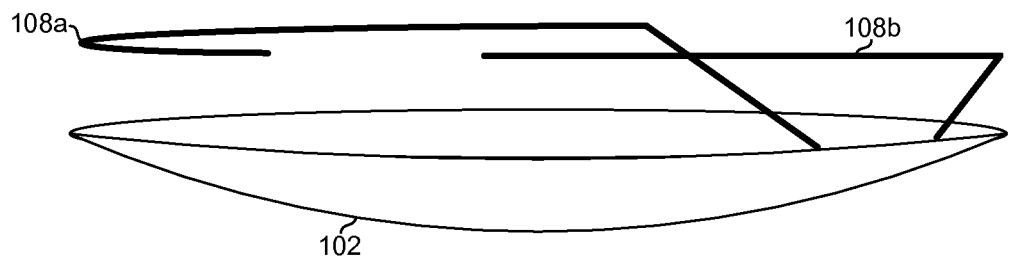

FIGS. 5A and 5B depict example implementations of a multi-service antenna. In FIG. 5A, the antenna elements 108a and 108b run along a surface of the reflector 102, rather than spanning a gap between the reflector and the support structure 116. In the example implementation depicted, the antenna element 108a is attached to a ground point located at the bottom center of the reflector 102 and runs along the edge of the reflector in a counter-clockwise direction. The antenna element 108b is attached to a ground point located at the bottom center of the reflector 102 and runs along the edge of the reflector in a clockwise direction. The elements 108a and 108b may be insulated from the reflector by, for example, an insulating shrouding on the antenna elements 108a and 108b.

In FIG. 5B, the antenna elements 108a and 108b generally follow the shape of the reflector 102, but rather than being separated from the reflector only by some shrouding as in FIG. 5A, the antenna elements 108a and 108b are extend outward from the reflector 102. In an implementation, each of the antenna elements 108a and 108b in FIG. 5B may be made of a rigid material (e.g., heavy-gauge wire or metal rods) and may support its own weight. Additionally or alternatively, each of the antenna elements 108a and 108b in FIG. 5B may be made supported by insulating standoffs which attach to the antenna elements 108a and 108b and to the reflector 102.

Figure 6:
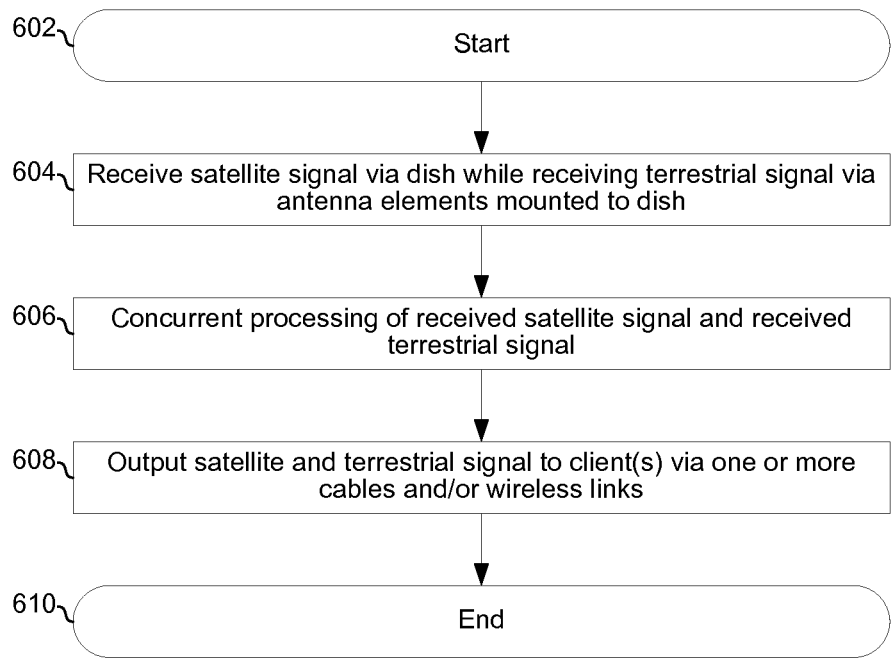
FIG. 6 is depicts a flowchart comprising example steps performed by a system comprising a multi-service antenna.

FIG. 6 is depicts a flowchart comprising example steps performed by a system comprising a multi-service antenna. The steps begin with step 602. In step 604, the multi-service antenna receives a satellite signal via a reflector and concurrently receives a terrestrial signal via the antenna elements 108a and 108b. In step 606, the received satellite signal and the received terrestrial signal are concurrently processed (e.g., as described below with reference to one or more of FIGS. 7A, 7B, and 8). In step 608, the processed satellite signal (or content recovered therefrom) and the processed terrestrial signal (or content recovered therefrom) are output to one or more clients (e.g., to an indoor set-top box, an indoor mobile device, and/or an outdoor mobile device) via one or more wired and/or wireless links (e.g., as described below with reference to one or more of FIGS. 7A, 7B, and 8 and/or as described in U.S. Provisional Patent Application Ser. No. 61/658,445, which is incorporated herein by reference, as set forth above).

Figure 7A:
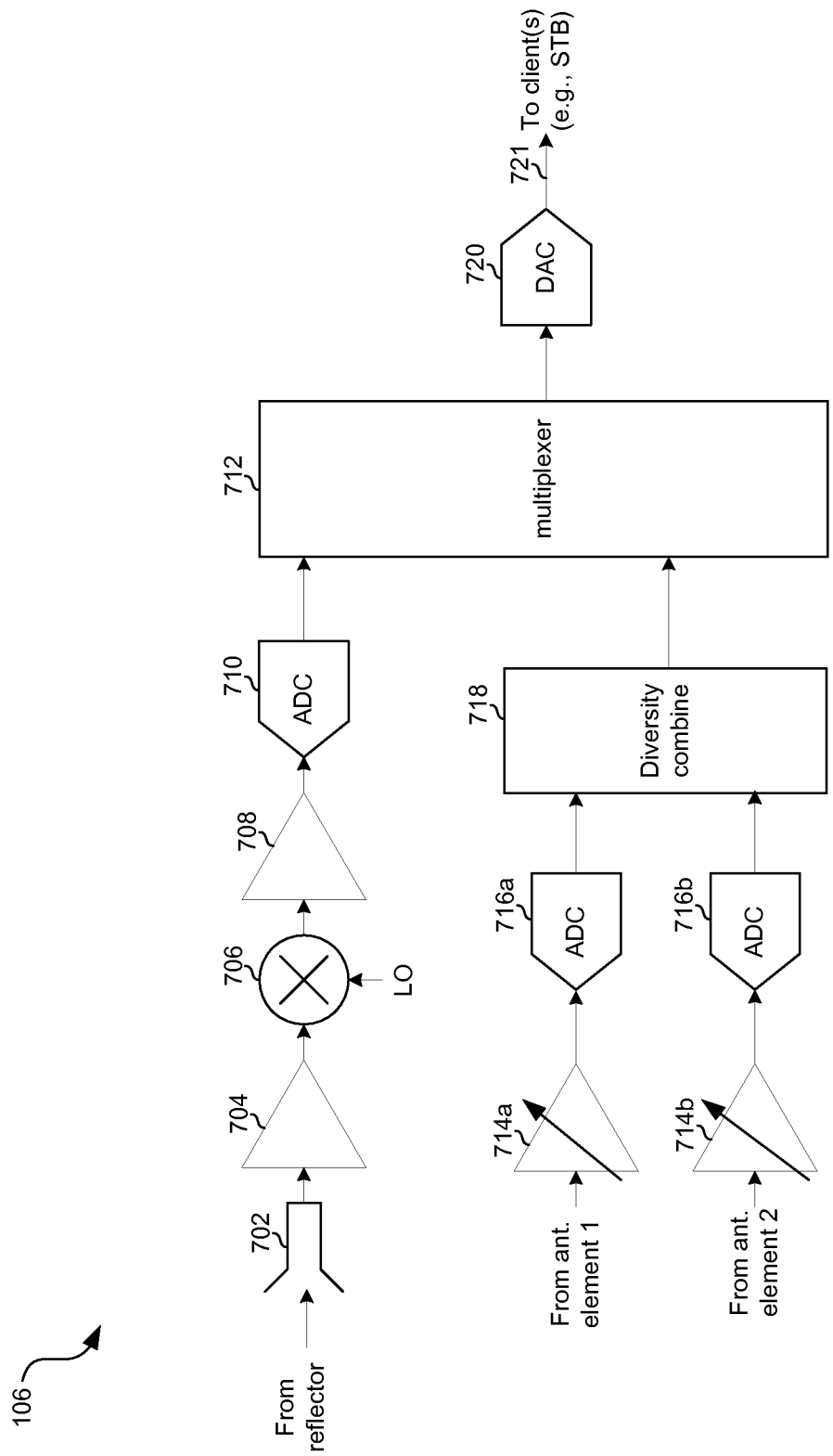
FIG. 7A depicts an example implementation of a signal processing assembly which may be mounted with a satellite dish assembly.

FIG. 7A depicts an example implementation of a signal processing assembly which may be mounted with a satellite dish assembly. In FIG. 7A, the assembly 106 comprises a feed horn 702, an amplifier 704, a mixer 706, an amplifier 708, an analog-to-digital converter (ADC) 710, a multiplexer 712, amplifiers 714a and 714b, ADCs 716a and 716b, a diversity combine module 718, and a digital-to-analog converter (DAC) 720. In various implementations, the components depicted in FIG. 7A may be implemented on one or more printed circuit boards (PCBs) and/or one or more integrated circuits (e.g., one or more silicon dice).

The feed horn 702 may be operable to collect satellite signals reflected by the reflector 102. The amplifier 704 may be a low-noise amplifier (LNA) operable to amplify a received satellite signal (e.g., in the Ku and/or Ka band). The mixer 706 may be operable to mix the output of the amplifier 704 with a local oscillator signal to downconvert the received satellite signal to a lower frequency band (e.g., to downconvert a 1 GHz block of frequencies in the Ku band to a 1 GHz block in the L band). The amplifier 708 may be operable to amplify signals output by the mixer 706. The ADC 710 may be operable to digitize the output of the amplifier 708. In this regard, the ADC 710 may be a wideband ADC operable to digitize the full downconverted block (e.g., 1 GHz) of signals output by the mixer 706.

The amplifiers 714a and 714b may each be operable to amplify a signal output by a corresponding one of the antenna elements 108a and 108b. Each of the ADCs 716a and 716b may be operable to digitize the output of a corresponding one of the amplifiers 714a and 714b. The diversity combine 718 may be operable to perform diversity combining of the two signals from the ADCs 716a and 716b and may be operable to perform additional digital processing such as I/Q calibration.

The multiplexer 712 may be operable to combine the output of the ADC 710 and the output of the diversity combine 718 for conversion to analog by DAC 720 and output as signal 721 onto one or more cables. In the implementation depicted in FIG. 7A, the output of the diversity combine engine 718 may be a VHF/UHF-band signal and the output of the ADC 710 may be an L-band signal. Accordingly, the signals may be multiplexed onto a single cable without interfering with one another and the signal on the single cable may be fed to both satellite and terrestrial tuners. In another implementation, the output of the diversity combine engine 718 may be upconverted and stacked with the received satellite signal into a single frequency band (e.g., L-band) as described in described in U.S. Provisional Patent Application Ser. No. 61/658,445, which is incorporated herein by reference, as set forth above.

Figure 7B:
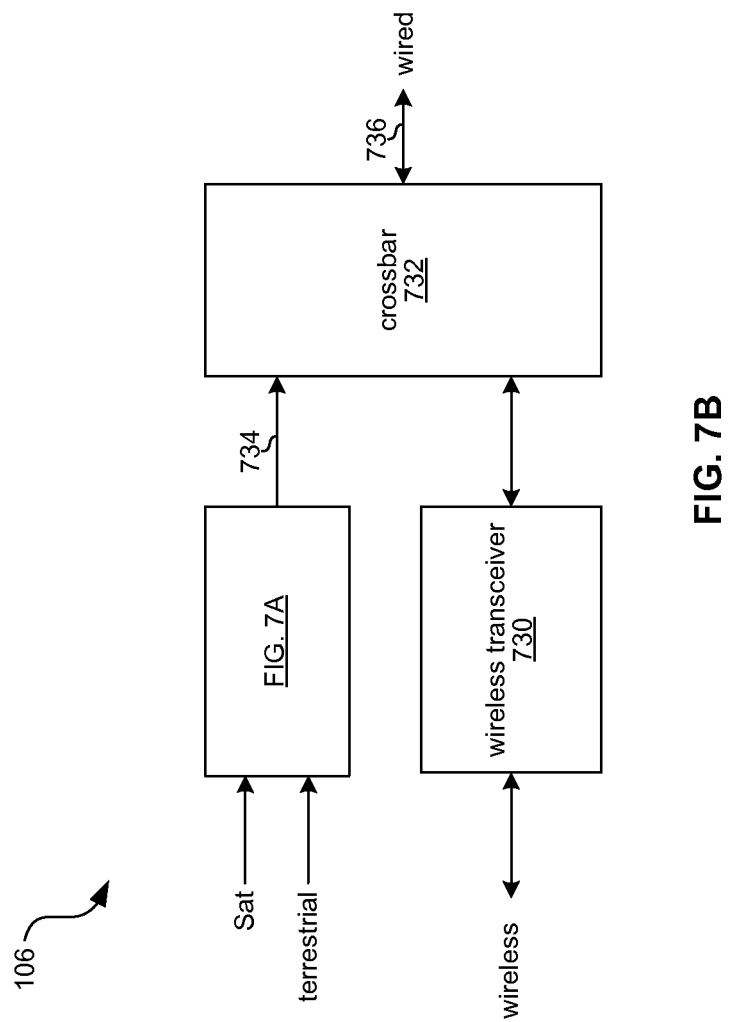
FIG. 7B depicts an example implementation of a wireless-enabled signal processing assembly which may be mounted with a satellite dish assembly.

FIG. 7B depicts an example implementation of a wireless-enabled signal processing assembly which may be mounted with a satellite dish assembly. In FIG. 7B, the assembly 706 comprises the components shown in FIG. 7B and additionally comprises a wireless transceiver 730 and a crossbar 732. In various implementations, the components depicted in FIG. 7B may be implemented on one or more printed circuit boards (PCBs) and/or one or more integrated circuits (e.g., one or more silicon dice).

The wireless transceiver may be operable to transmit and receive utilizing any suitable protocols such as, for example, the 802.11 family of standards ("Wi-Fi") and/or long-term evolution ("LTE").

The crossbar 732 may be operable to route the signal/data 734 to one or more wired links 736 and/or to the wireless transceiver 730, and route signals/data between the wired link(s) 736 and the wireless transceiver 730.

In operation, terrestrial and satellite content may be received and processed by the components of FIG. 7A and conveyed to the crossbar 732. The crossbar may then route the received terrestrial and/or satellite content to clients via the wired link(s) 736 and/or via one or more wireless connections handled by the transceiver 730. In various example implementations, the satellite and/or terrestrial content may be unicast, multicast, and/or broadcast by the transceiver 730.

Figure 8:
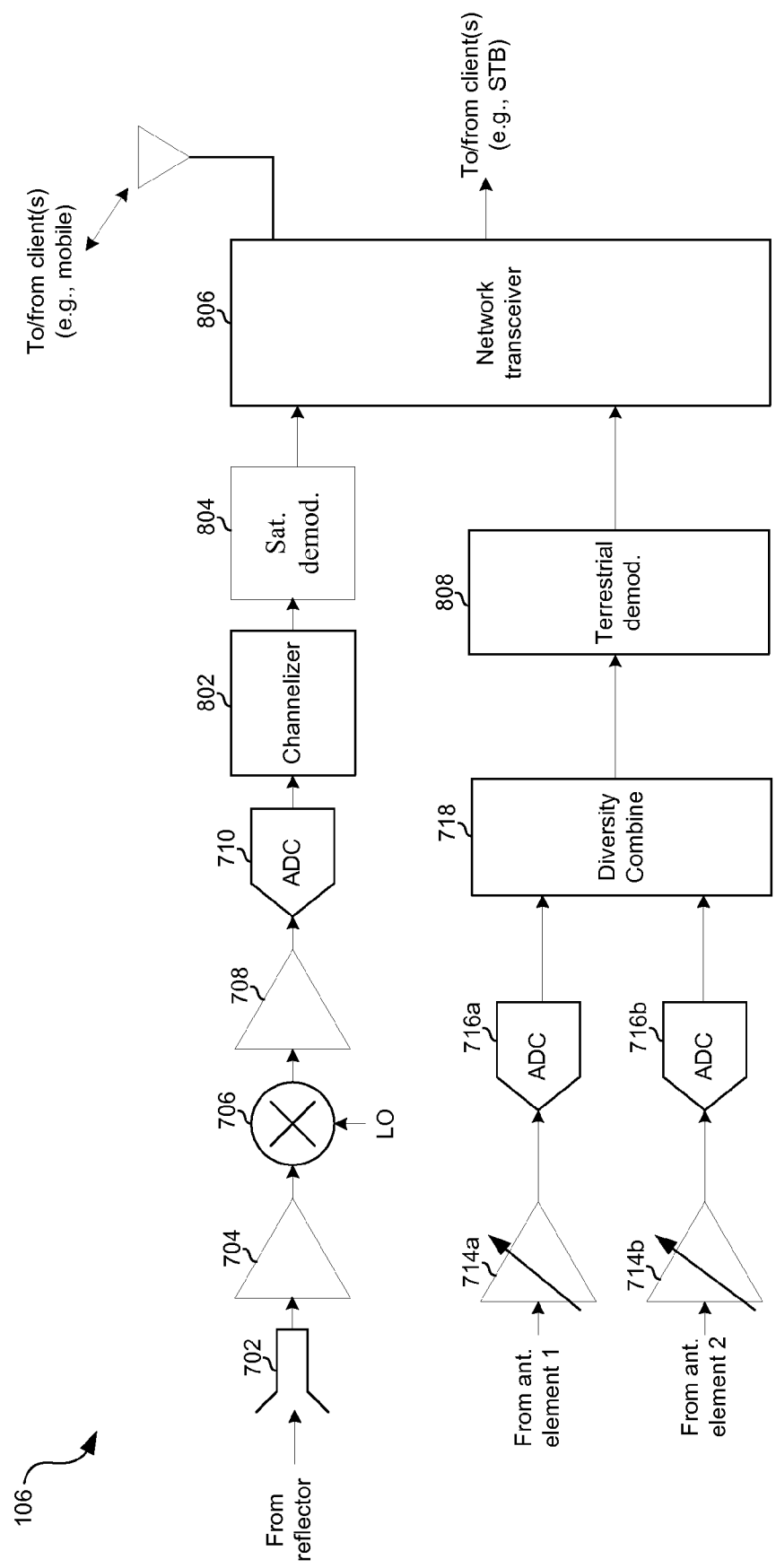
FIG. 8 depicts another example implementation of a signal processing assembly which may be mounted with a satellite dish assembly.

FIG. 8 depicts another example implementation of a signal processing assembly which may be mounted with a satellite dish assembly. The implementation of the assembly 106 depicted in FIG. 8 comprises the feed horn 702, amplifier 704, mixer 706, amplifier 708, ADC 710, amplifiers 714a and 714b, ADCs 716a and 716b, and diversity combine module 718 described above with reference to FIG. 7A. The implementation in FIG. 8 also comprises a channelizer 802, a satellite signal demodulator 804, a terrestrial signal demodulator 806, and a network transceiver 808. In various implementations, the components depicted in FIG. 8 may be implemented on one or more printed circuit boards (PCBs) and/or one or more integrated circuits (e.g., one or more silicon dice).

The channelizer 802 may be operable to process the digitized signal output by ADC 710 to select and output one or more channel(s) of the satellite signal (e.g., channels that have been selected for consumption by a client coupled to the assembly 106). As such, the channelizer 802 may, for example, serve as a crossbar for selecting an arbitrary set of desired channels from among the channels available in the received satellite signal.

The satellite signal demodulator 804 may be operable to demodulate the channel(s) output by the channelizer 802 to recover one or more transport streams. In an exemplary implementation, the demodulator 804 may comprise a plurality of DVB-S demodulators such that it is operable to concurrently demodulate a plurality of satellite channels.

The terrestrial signal demodulator 808 may be operable to demodulate the signal output by the diversity combine module 718 to recover one or more transport streams. In various exemplary implementations, the demodulator 808 may comprise a plurality of demodulators (each adapted for one or more standards such as DVB-T, ISDB-T, ATSC) such that it is operable to concurrently demodulate a plurality of terrestrial channels.

The network transceiver 806 may be operable to receive the transport streams received from the demodulators 804 and 808, packetize and/or otherwise format the transport streams, and output the transport streams onto one or more wired and/or wireless connections. In various exemplary implementations, the network transceiver 806 may communicate with one or more set-top boxes and/or other client devices, such as a mobile device, utilizing Internet Protocol, Ethernet, Wi-Fi, DOCSIS, MoCA, and/or any other suitable protocol. In various example implementations, the satellite and/or terrestrial content may be unicast, multicast, and/or broadcast by the transceiver 806.

Figure 9B:
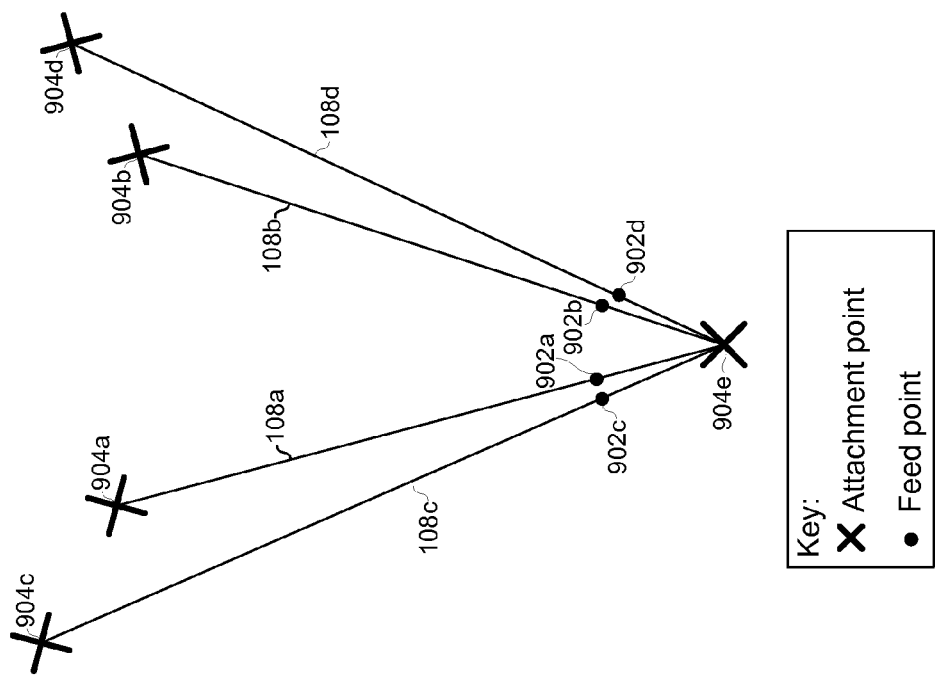
Figure 9A:
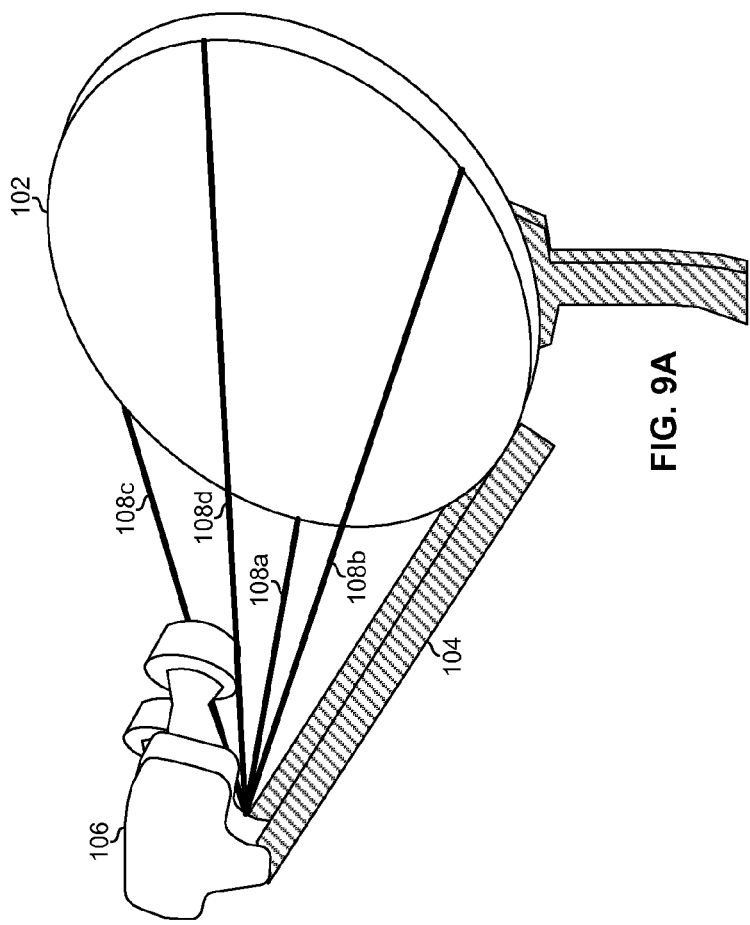

FIG. 9A depicts an example implementation of a multi-service antenna comprising more than two antenna elements. The implementation shown in FIG. 9A is similar to the one shown in FIG. 1, but has four antenna elements 108a, 108b, 108c, and 108d. As shown in FIG. 9B, signals may be coupled from the antenna elements 108a-108e at feed points 902a-902d, respectively, and the antenna elements 108a-108d may be attached to the satellite assembly 100 at attachment points 904a-904d, respectively.

FIG. 9C depicts an implementation similar to the one shown in FIG. 5B. In FIG. 9C, however, there are four antenna elements 108a, 108b, 108c, and 108d. Although implementations of two and four antenna elements are depicted herein, various implementations may comprise any number of antenna elements.

FIG. 9D depicts example circuitry operable to interface to a multi-service antenna comprising more than two antenna elements. In FIG. 9D, the assembly 106 comprises an antenna select module 902 and a diversity receive module 904.

The diversity receive module 904 may comprise circuitry similar to or the same as is described in the above-incorporated U.S. Provisional Patent Application 61/658,445. The antenna select module 902 may be operable to select which antenna element of the multi-service antenna element is coupled to the diversity receive module 904. Where a multi-service antenna comprises N (an integer greater than or equal to two) antenna elements 108, and the diversity receive module 904 is operable to perform diversity combining of M (an integer number less than or equal to N) signals, the antenna select module 902 may be operable to couple any M of the antenna elements to the diversity receive module 904. In FIGS. 9A-9C, for example, N=4 and M=2.

Which antenna elements are selected may be based, for example, on which content has been selected for consumption by a client. Such information may be communicated to the assembly 106 using a communication protocol such as DiSEqC. Additionally or alternatively, which antenna elements are selected may be based on receives signal characteristics, as described below with respect to FIG. 10.

In another implementation, rather than selecting between different antenna elements, the antenna select module 902 may select among different feed points of each of one or more antenna elements.

Figure 10:
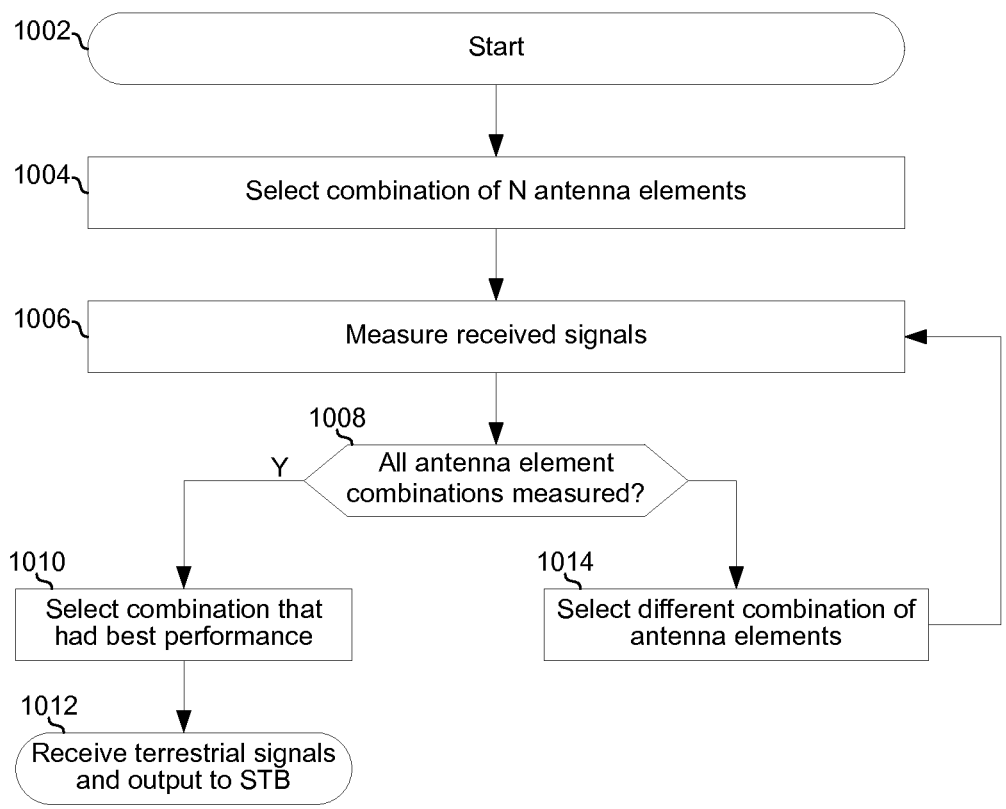
FIG. 10 depicts a flowchart comprising exemplary steps performed by a system for selecting which antenna elements of a multi-service antenna to utilize for reception.

FIG. 10 depicts a flowchart comprising exemplary steps performed by a system for selecting which antenna elements of a multi-service antenna to utilize for reception. The steps begin with start step 1002. In step 1004, the antenna select module 902 selects combination of antenna elements. In step 1006, the diversity receive module 904 processes the signals received via the selected antenna elements, and may generate and store some performance metric (e.g., signal-to-noise ratio, received signal strength, bit error rate, etc.) of the quality of the received signals and/or the quality of the signal resulting from combining the received signals. In step 1008, it is determined whether all combinations of antenna elements have been measured. If not, then in step 1014 a different combination of antenna elements is selected and then the steps return to step 1006.

Returning to step 1008, if all combinations of antenna elements have been measured, then in step 1010, the diversity receive module 1010 may select the combination that achieved the best performance. Then in step 1012 signals received via the selected combination of antenna elements may be processed and output to a client.

Figure 11:
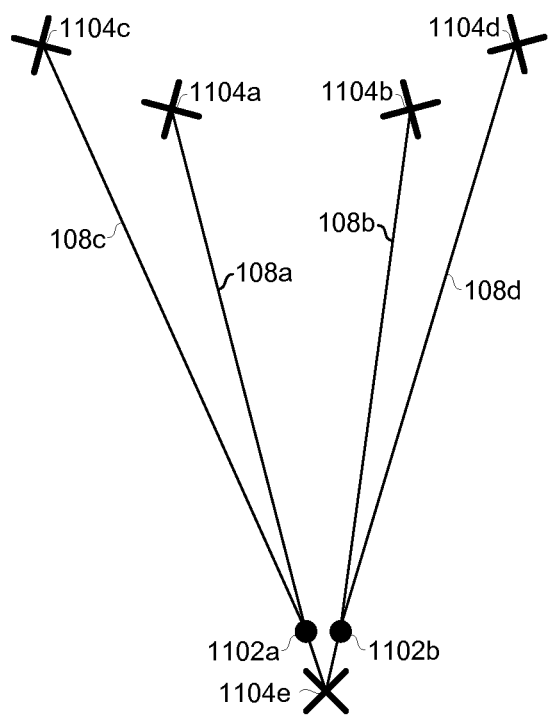
FIG. 11 depicts an example implementation of a multi-service antenna comprising two dipole antennas.

FIG. 11 depicts an example implementation of a multi-service antenna comprising two dipole antennas. In FIG. 11, the antenna elements 108a-108d are attached to the satellite dish assembly 100 at attachment points 1104a-1104d, respectively. Additionally, in contrast to FIG. 9A, antenna elements 108a and 108c are fed at a common feed point 1102a and antenna elements 108b and 108d are fed at a common feed point 1102b. In this manner, the antenna elements 108a and 108c form a first V-shaped dipole and the antenna elements 108d form a second V-shaped dipole. In another implementation, which of the antenna elements 108a-108d are fed from a common feed point may be configurable such that any two of the four antenna elements 108a-108d can be coupled to a first common feed point to form a first dipole and the remaining two of the antenna elements 108a-108d can be coupled to a second common feed point to form a second dipole.

Figure 12A:
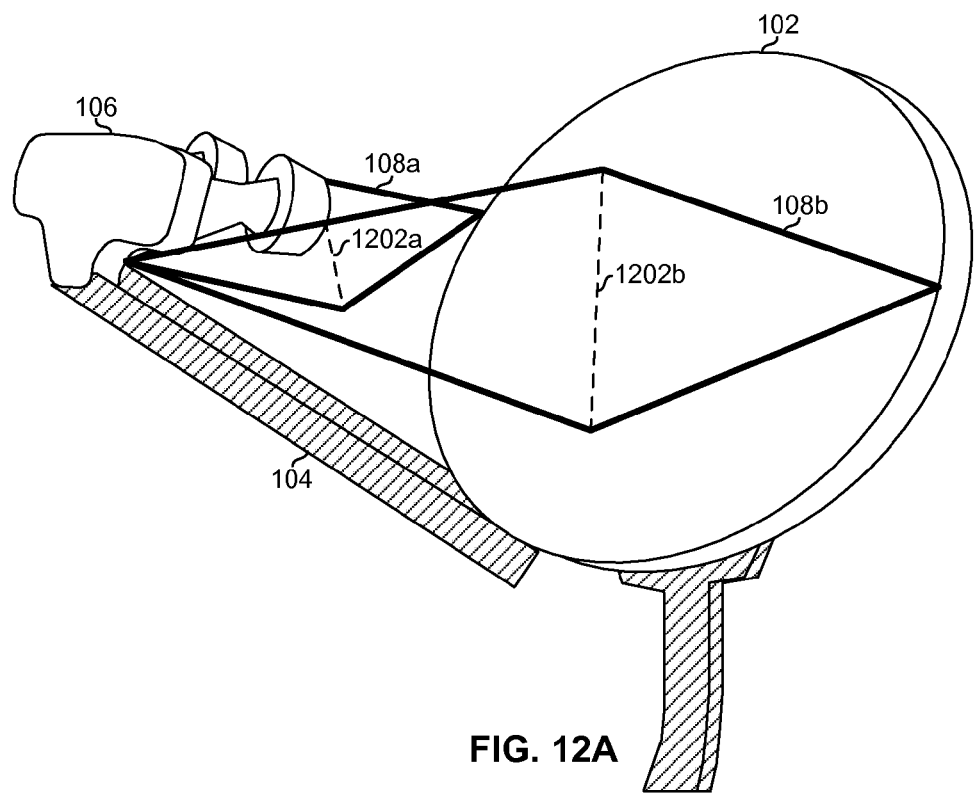
FIGS. 12A-12C depicts example implementations of a multi-service antenna comprising loop antennas.
Figure 12B:
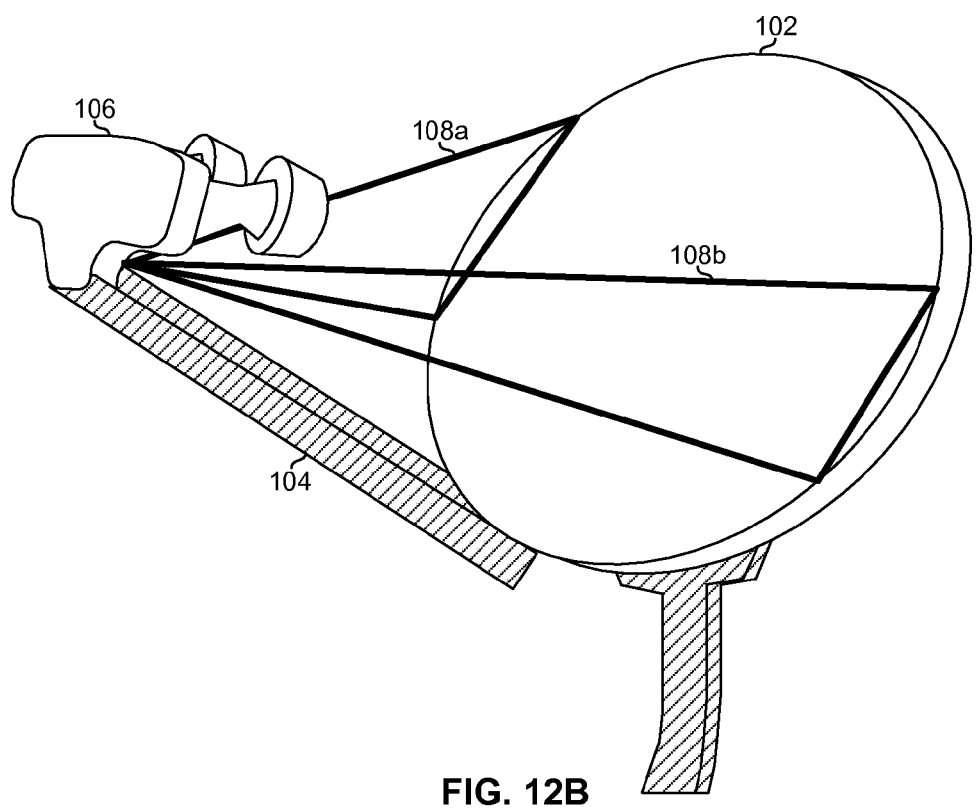
Figure 12C:
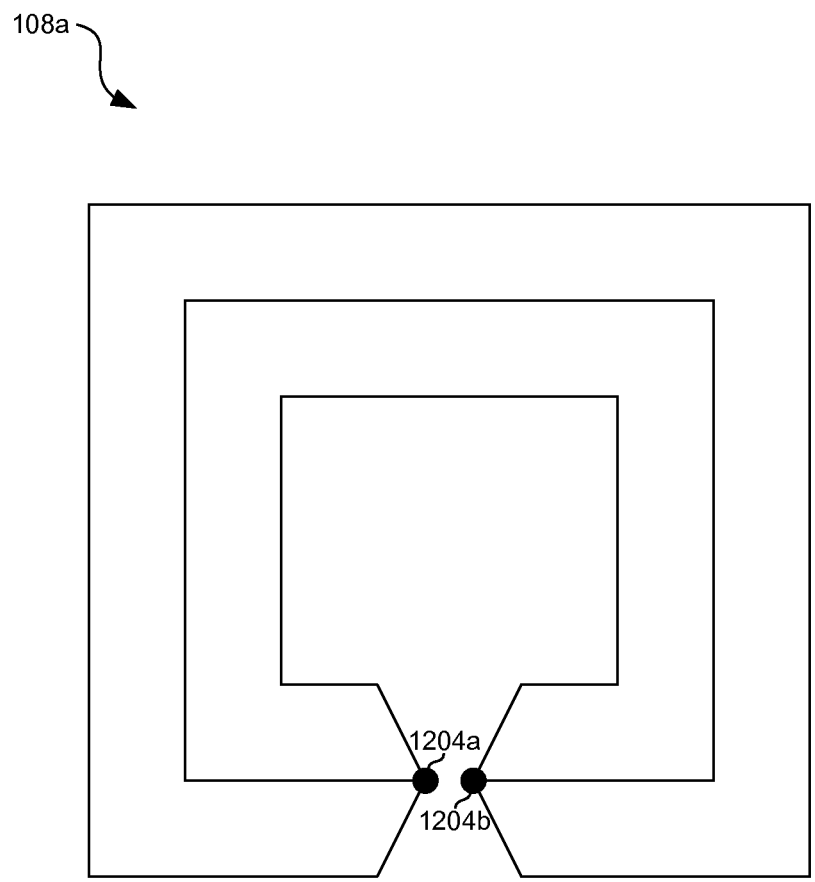

FIGS. 12A-12C depicts example implementations of a multi-service antenna comprising loop antennas. In FIG. 12A, the antenna elements 108a and 108b are each quadrilateral loops. The shape of the loops may be maintained, for example, by the antenna elements 108a and 108b being made of a rigid material, or by spacers (e.g., made of plastics) indicated by dashed lines 1202a and 1202b.

In FIG. 12B, the antenna elements 108a and 108b are each triangular loops. The triangular shape may be maintained by, for example, attaching each of the antenna elements 108a and 108b to the satellite dish assembly 100 at three attachment points.

Although FIGS. 12A and 12B depict single loops having four and three sides, respectively, each antenna element 108a may be a loop of any shape and/or may comprise multiple loops. For example, FIG. 12C depicts an antenna element 108a forming a quadrilateral, three-loop antenna fed at feed points 1204a and 1204b.

In any of the various implementations described herein, one or more of the antenna elements 108a, 108b, 108c, and 108d may be made of a flexible material (e.g., copper and/or aluminum wire) and/or rigid material (e.g., copper or aluminum rods). In any of the various implementations described herein, any portion of any one or more of the antenna elements 108a, 108b, 108c, and 108d may have any shape (e.g., straight, bent, kinked, coiled, etc.) suitable for achieving desired transmit and/or receive characteristics. In any of the various implementations described herein, any one or more of the antenna elements 108a, 108b, 108c, and 108d may have an LC resonator ("trap") along its length.

Figure 13A:
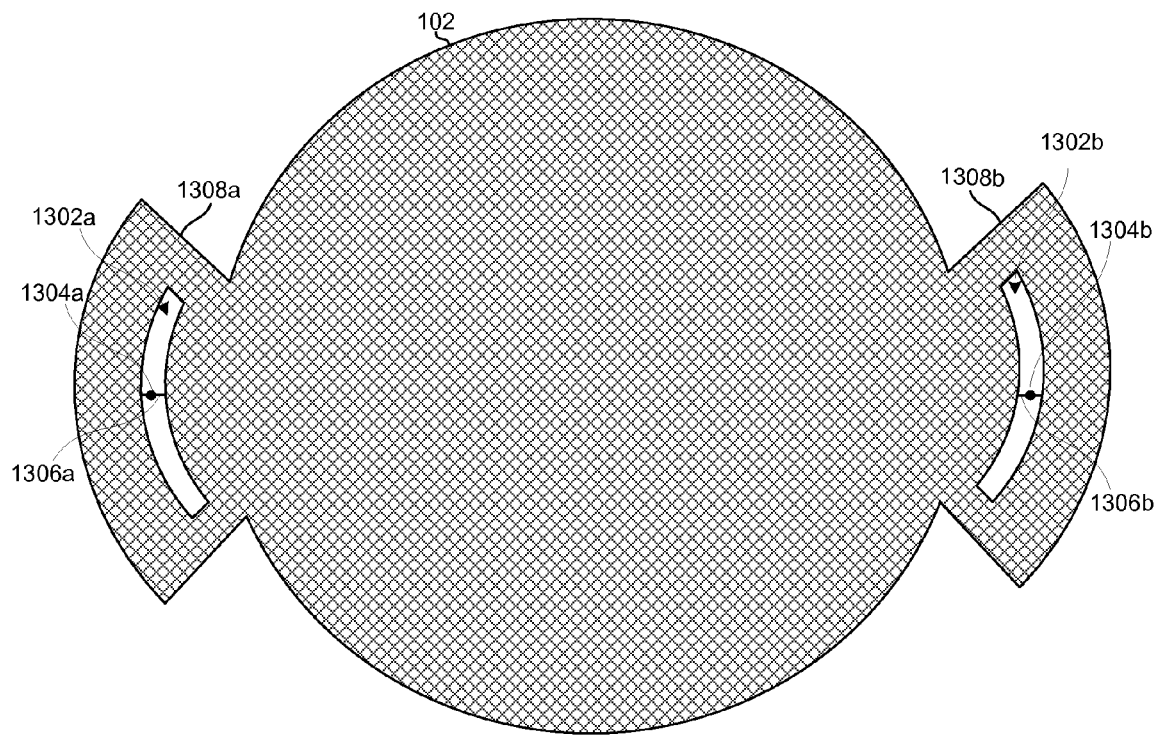
FIGS. 13A and 13B depict an example implementation of a multi-service antenna comprising slot antennas.
Figure 13B:
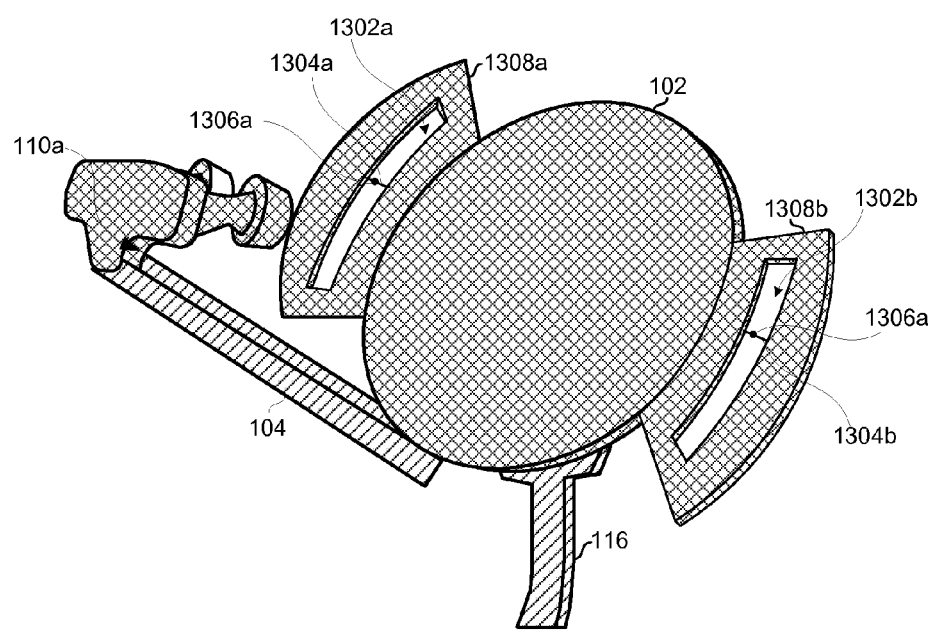

FIGS. 13A and 13B depict an example implementation of a multi-service antenna comprising slot antennas. FIG. 13A shows a front view of the parabolic reflector 102 having extensions 1308a and 1308b mounted to it. FIG. 13B shows the satellite assembly 100 comprising the slot antenna extensions 1308a and 1308b. In an example implementation, the extensions 1308a and 1308b may be mounted to the reflector 102 via one or more clamps, bolts, etc. In another example implementation, the reflector 102 and the extensions 1308a and 1308b may be a single continuous piece (e.g., a single molded piece of fiberglass or metal).

Within the extension 1308a is a slot antenna 1302a having a feed point 1304a. The feed point 1304a is positioned in the slot 1302a via a support 1306a. The feed point 1304a and support 1306a may be located at any suitable location within the slot 1302a. In an example implementation, the location of the support 1306a and/or the feed point 1306a may be adjustable.

Within the extension 1308b is a slot antenna 1302b having a feed point 1304b. The feed point 1304b is positioned in the slot 1302b via a support 1306b. The feed point 1304b and support 1306b may be located at any suitable location within the slot 1302b. In an example implementation, the location of the support 1306b and/or the feed point 1306b may be adjustable.

A size, shape, and/or position of the extensions 1308a and 1308b, and/or the slot antennas 1302a and 1302b therein may be determined in order to achieve desirable receive characteristics for the signals (e.g., terrestrial television signals) to be received.

Operation of the implementation shown in FIGS. 13A and 13B may be similar to operation of implementations comprising antenna elements 108a and 108b described above. That is, a signal from a first source (e.g., terrestrial television signals) may be received via each of the slot antennas concurrent with reception of a satellite signal via the parabolic reflector 102. The signals from the two slot antenna may be diversity combined. In other implementations, more than two slot antennas may be present and an antenna select, such as the antenna select module 902, may be utilized to select which of the slot antennas are utilized.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for multi-service reception.

Accordingly, the present method and/or apparatus may be realized in hardware, software, or a combination of hardware and software. The present method and/or apparatus may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present method and/or apparatus may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A system comprising:
    a satellite dish assembly;
    a plurality of antenna elements mounted to said satellite dish assembly, said plurality of antenna elements being configured for reception of terrestrial television signals, wherein:
        each of said plurality of antenna elements comprises a wire attached to said satellite dish assembly at two attachment points;
        a first of said two attachment points is on a boom of said satellite dish assembly; and
        said first of said two attachment points is slidably adjustable along said boom; and
    circuitry, mounted with said satellite dish assembly, for diversity combining of a plurality of said terrestrial television signals received via said plurality of antenna elements.

2. The system of claim 1, wherein each of said plurality of antenna elements is adjustable in length to accommodate different positions of said first of said two attachment points along said boom.

3. The system of claim 1, wherein:
said circuitry comprises a selector controllable to select a subset of said plurality of antenna elements to be used for said reception of said plurality of said terrestrial television signals.

4. The system of claim 3, wherein said selector is controlled based on measured performance metrics of said plurality of said terrestrial television signals.

5. The system of claim 3, wherein said selector is operable to measure performance of a plurality of subsets of said plurality of antenna elements and select one of said plurality of subsets that achieves best performance.

6. The system of claim 1, wherein:
said satellite dish assembly is configured for reception of satellite signals in a first frequency band; and
said terrestrial television signals are in a second frequency band.

7. The system of claim 6, wherein:
said first frequency band comprises one or more of: X-band, Ka-band, and Ku-band; and
said second frequency band comprises one or more of: VHF band and UHF band.

8. A system comprising:
a satellite dish assembly;
a plurality of antenna elements mounted to said satellite dish assembly, said plurality of antenna elements being configured for reception of terrestrial television signals; and
circuitry, mounted with said satellite dish assembly, for diversity combining of a plurality of said terrestrial television signals received via said plurality of antenna elements, wherein:
said satellite dish assembly is configured for reception of satellite signals in a first frequency band;
said terrestrial television signals are in a second frequency band; and
each of the plurality of antenna elements is a slot antenna, each said slot antenna being formed in a parabolic reflector of said satellite dish assembly.

9. A method comprising:
receiving satellite signals via a reflector of a satellite dish assembly;
receiving terrestrial television signals via a plurality of antenna elements attached to said satellite dish assembly, wherein:
each of said plurality of antenna elements is a slot; and
each said slot is formed in a parabolic reflector of said satellite dish assembly;
performing diversity combining of said received terrestrial television signals; and
outputting a television signal resulting from said diversity combining onto a cable that also carries an output of a low-noise block (LNB) that processes said received satellite signals.

10. The method of claim 9, comprising:
selecting a subset of said plurality of antenna elements to be used for said receiving said terrestrial television signals.

11. The method of claim 10, comprising controlling said selecting based on measured performance metrics of said terrestrial television signals.

12. The method of claim 11, comprising measuring performance of a plurality of subsets of said plurality of antenna elements and selecting one of said plurality of subsets that achieves best performance.

13. A system comprising:
a support structure;
a satellite signal reflector mounted to said support structure;
a signal processing assembly mounted to said support structure;
a slot antenna formed in said satellite signal reflector; and
circuitry for processing a signal received via said slot antenna.

14. The system of claim 13, wherein said circuitry for processing said signal received via said slot antenna is housed in said signal processing assembly.

15. The system of claim 13, wherein said signal received via said slot antenna is a terrestrial television signal in the UHF band and/or VHF band.

16. The system of claim 13, comprising:
a plurality of slot antennas formed in said satellite signal reflector; and
selector circuitry controllable to select a subset of said plurality of slot antennas to be used for reception of signals.

17. The system of claim 16, wherein said selector circuitry is controlled based on measured performance metrics of said signals.

18. The system of claim 17, wherein said selector circuitry is operable to measure performance of a plurality of subsets of said plurality of slot antennas and select one of said plurality of subsets that achieves best performance.

* * * * *